May 10, 1966    K. BROTZMANN    3,250,061
DEGASIFICATION TANKS FOR METAL MELTS
Filed June 19, 1964
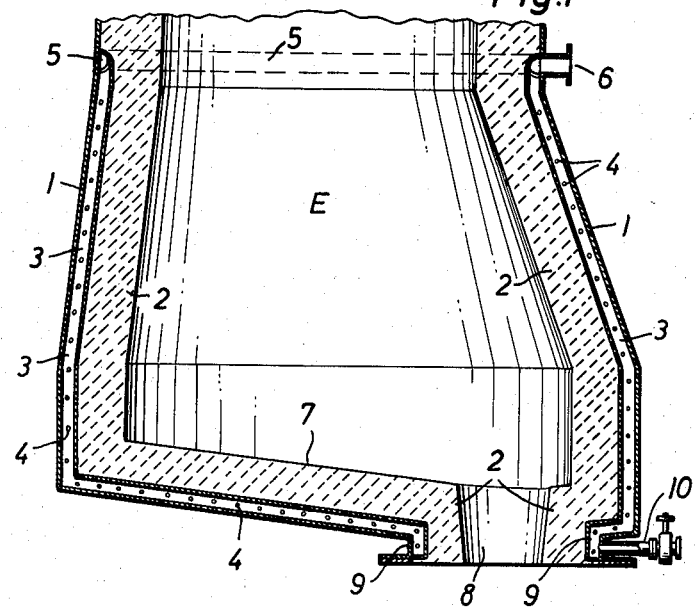
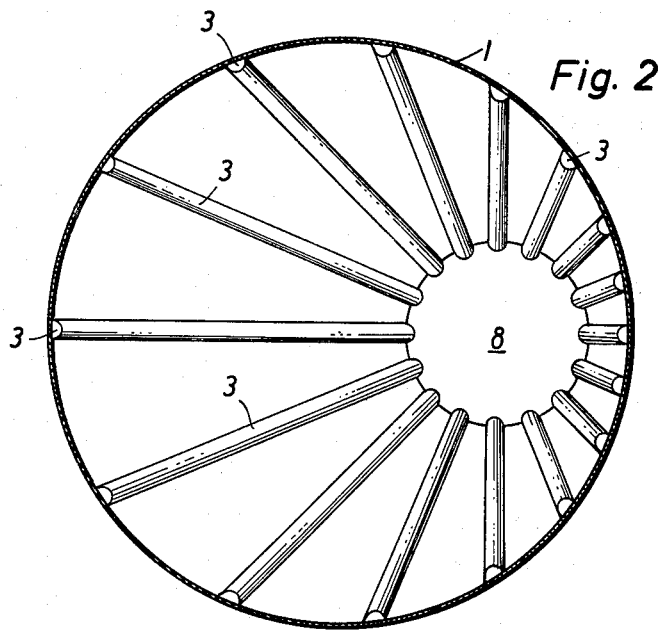

3,250,061
DEGASIFICATION TANKS FOR METAL MELTS
Karl Brotzmann, Westhofen-Buchholz, near Schwerte (Ruhr), Germany, assignor to Dortmund-Horder Huttenunion Aktiengesellschaft, Dortmund, Germany
Filed June 19, 1964, Ser. No. 376,480
Claims priority, application Germany, Aug. 10, 1963, D 42,211
2 Claims. (Cl. 55—189)

Molten metals are usually desgasified under reduced pressure in tanks surrounded by a gas-tight steel jacket and having a refractory lining. Degasification tanks of this kind are initially under normal atmospheric pressure. Since the gas present in the lining pores is sucked away on evacuation of the vessel, a positive gradient may periodically form across the lining, depending on the speed at which the pressure is reduced and depending on the gas-permeability of the lining. With vessels which have already been used and the linings of which have a glaze-like coating, it is practically impossible for the included gases to escape to the interior of the vessel. Pressure differences of up to approximately 1 atmosphere may then momentarily occur and exert a considerable tensile stress on the lining. Since, for example, magnesite bricks when hot have a tensile strength of only 1 kg. per sq. cm., unfavorable conditions may result in the degasification vessel lining being damaged. In addition, the tank jacket prevents any escape to the exterior of the water vapor forming on the drying of the lining. The water vapor then precipitates in the region of the cold outer surface of the lining. When the tank is heated up again, it escapes through the hot bricks into the interior of the tank, but if there is condensed water at the back of the lining when degasification begins, such condensed water evaporates rapidly and may cause considerable damage to the masonry bond.

In accordance with the invention, a vacuum tank has a refractory lining which is surrounded by a gas-tight steel jacket with both a layer of insulation and a system of conduits disposed in the space between the steel jacket and the outer surface of the lining, the system of conduits comprising a number of perforated tubes which extend between an upper ring conduit at the top of the tank and a lower ring conduit surrounding a metal inlet and outlet aperture in the base of the tank, the upper ring conduit being fitted with a tubular connection for connection to a vacuum pump.

Preferably, a closable drain is provided in the lower ring conduit for discharging condensed water.

The conduit system surrounding the tank lining is embedded in the relatively gas-permeable layer of insulation between the jacket and the tank lining. When the upper ring conduit is also connected to a vacuum pump during a degasification operation, the space occupied by the layer of insulation, and hence the refractory lining as well, are evacuated from their outer periphery so that the pressure differential across the refractory lining is eliminated or reduced.

One example of a tank constructed in accordance with the invention is illustrated in the accompanying drawings, in which:

FIGURE 1 is a central vertical section through the tank; and,

FIGURE 2 is an underneath plan of the tank with the outer jacket removed.

A space filled with insulating material is provided between a vacuum-tight steel jacket 1 of the degasification tank E and its refractory lining 2. Embedded in this space is a system of conduits consisting of spaced tubes 3 formed with a number of apertures 4. The tubes 3 are connected to an upper conduit 5, whence a connection 6 leads out for connection to a vacuum pump. From the ring conduit 5 the tubes extend to a metal inlet and outlet aperture 8 formed in a base 7 of the tank. Here the tubes communicate with a lower ring conduit 9 which is situated between the lining 2 and the jacket 1 and from which a closable tubular connection 10 leads out. This is used to discharge any condensed water.

The tube system 3, 4, 5, 9 and 10 also enables the space between the jacket and the lining to be filled with inert pressurized gas which can be fed into the tank, for example through ducts in the tank base, as a scavenging gas during the degasification operation if desired.

I claim:

1. A vacuum tank for the degasification of metal melts, said tank having side walls and a base, a metal inlet and outlet aperture in said base, an outer gas-tight steel jacket, a refractory lining within said jacket, and a layer of insulating material and a system of conduits both disposed between said steel jacket and the outer surface of said lining, said system of conduits comprising an upper ring conduit at the top of said tank, a lower ring conduit surrounding said metal inlet and outlet aperture, a number of perforated tubes extending between said upper ring conduit and said lower ring conduit and connection means fitted to said upper ring conduit for connection to a vacuum pump.

2. A vacuum tank according to claim 1, wherein said lower ring conduit is provided with a drain for discharging condensed water, and means selectively closing said drain.

References Cited by the Examiner
UNITED STATES PATENTS

| | | | |
|---|---|---|---|
| 402,871 | 5/1889 | Truesdale | 22—81 |
| 2,079,765 | 5/1937 | Goldberg | 266—39 |
| 3,203,686 | 8/1965 | Wooding et al. | 266—34 |

REUBEN FRIEDMAN, *Primary Examiner.*

R. W. BURKS, *Assistant Examiner.*